US007155022B2

(12) United States Patent
Danielsen et al.

(10) Patent No.: US 7,155,022 B2
(45) Date of Patent: Dec. 26, 2006

(54) ELECTROMAGNETIC FEEDBACK REDUCTION IN COMMUNICATION DEVICE

(75) Inventors: Finn Danielsen, Hellerup (DK); Peter Lundh, Hellerup (DK); Michael Ekelid, Hellerup (DK)

(73) Assignee: Oticon A/S, Smørum (DK)

( * ) Notice: Subject to any disclaimer, the term of this patent is extended or adjusted under 35 U.S.C. 154(b) by 463 days.

(21) Appl. No.: 10/169,712

(22) PCT Filed: Jan. 18, 2001

(86) PCT No.: PCT/DK01/00037

§ 371 (c)(1),
(2), (4) Date: Sep. 24, 2002

(87) PCT Pub. No.: WO01/54452

PCT Pub. Date: Jul. 26, 2001

(65) Prior Publication Data

US 2003/0133579 A1 Jul. 17, 2003

(30) Foreign Application Priority Data

Jan. 21, 2000 (EP) ................................. 00610008

(51) Int. Cl.
*H04R 25/00* (2006.01)
*H04R 3/00* (2006.01)
*H04B 15/00* (2006.01)

(52) U.S. Cl. ........................ 381/318; 381/312; 381/93; 381/96

(58) Field of Classification Search .................. 381/83, 381/95–96, 93, 58–59, 318
See application file for complete search history.

(56) References Cited

U.S. PATENT DOCUMENTS

| | | | | |
|---|---|---|---|---|
| 4,752,733 | A | 6/1988 | Petr et al. | |
| 5,197,104 | A * | 3/1993 | Padi | 381/96 |
| 5,471,504 | A | 11/1995 | Lee et al. | |
| 5,717,772 | A * | 2/1998 | Lane et al. | 381/93 |
| 5,842,115 | A | 11/1998 | Dent | |
| 6,219,427 | B1 | 4/2001 | Kates et al. | |
| 6,738,485 | B1 * | 5/2004 | Boesen | 381/312 |
| 6,876,751 | B1 * | 4/2005 | Gao et al. | 381/318 |
| 6,931,137 | B1 * | 8/2005 | Arndt et al. | 381/83 |
| 7,043,041 | B1 * | 5/2006 | Svajda et al. | 381/331 |
| 2002/0039428 | A1 * | 4/2002 | Svajda et al. | 381/331 |
| 2004/0037443 | A1 * | 2/2004 | Beimel et al. | 381/321 |
| 2006/0147069 | A1 * | 7/2006 | Svajda et al. | 381/316 |

* cited by examiner

*Primary Examiner*—Laura A. Grier
(74) *Attorney, Agent, or Firm*—Dykema Gossett PLLC

(57) ABSTRACT

The invention relates to a method for reducing feedback caused by electromagnetic interference between an induction coil and an output transducer, a voltage supply or an amplifier or a combination thereof, the method comprising: producing by means of a filter an equivalent of an electromagnetic feedback path in a system with a pickup coil and subtraction of the equivalent of the feedback signal from the input signal in order to obtain feedback reduction. The invention further relates to a device for implementing the method, the device comprising an induction coil and an output transducer, voltage supply or an amplifier or a combination thereof. The device further comprises filter means for generating an equivalent of an electromagnetic feedgack signal occurring between the induction coil and an output transducer, a voltage supply or an amplifier or a combination thereof and means for subtracting the equivalent from an input signal in order to obtain feedback reduction.

9 Claims, 1 Drawing Sheet

ELECTROMAGNETIC FEEDBACK REDUCTION IN COMMUNICATION DEVICE

FIELD OF THE INVENTION

The present invention primarily concerns communication devices containing an electromagnetic pickup coil whose electric output signal is amplified and then transferred or transmitted by a further transducer in such a way that a stronger electromagnetic field is produced physically close to the pickup coil. Other sources of interference may also exist.

BACKGROUND OF THE INVENTION

One example of such systems is a hearing aid, in which a so-called telecoil picks up an externally generated electromagnetic field, the coil signal is amplified, and the amplified signal is driving a loudspeaker (commonly called a "receiver"). In this system, the alternating current flowing in the power supply, the amplifier as well as the receiver, will produce an electromagnetic field. This field may induce a voltage in the telecoil, and a closed loop is formed. The result may be discretion in worst cases a loud audible feedback "howl", which is undesirable and interferes with the desired operation of the system.

Previously a number of attempts have been made in order to reduce the effect of this electromagnetic feedback. These count magnetic shielding and spacing of the transducers. These attempts have some effect on reducing the feedback but still a significant part of the problem remains unsolved. Besides this the previously known solutions are difficult to handle from a manufacturing point of view and very non-desirable from a cosmetic point of view as the devices tend to be larger. There is therefore a need for improvement in handling this type of feedback One objective of the present invention is to provide a method for use in a device as defined above and intended for reducing feedback in a manner where the system gain may be significantly increased compared to what has been possible until today without causing the creation of an oscillating feedback signal.

A further objective of the present invention is to provide a device of the type mentioned above where the system gain may be significantly increased compared to what has been possible until today without causing the creation of an oscillating feedback signal between the two transducers.

SUMMARY OF THE INVENTION

According to the invention the first objective is achieved by means of a method as defined in claim 1.

By the method the electromagnetic feedback signal is compensated by a correction signal. By using such method the discomfort produced by an oscillating feedback signal can be at least reduced and in most cases totally avoided. In addition more system gain may be achieved without the occurrence of oscillating feedback. The electromagnetic interference may arise between an induction coil and an output transducer, a voltage supply or an amplifier or a combination thereof.

In a preferred embodiment the method features detection of the feedback and production of the equivalent correction signal is produced when feedback is detected. This may be done in production or at a fitting of the device to the end user. This will in most situations be sufficient since the transducer and the coil are fixed in relation to each other and the feedback signal is most often not influenced by the surroundings.

In a further preferred embodiment of the method for reducing feedback is an adaptive method. Hereby the production of the feedback equivalent is adjusted in correspondence to the input in any situation that may occur.

According to the invention the second objective is achieved by means of a device as defined in claim 5.

This device compensates the electromagnetic feedback signal by a correction signal like in connection with the above-mentioned method. By using such device the discomfort produced by an oscillating feedback signal can be at least reduced and in most cases totally avoided. In addition more output gain may be achieved without the occurrence of oscillating feedback.

An analog filter may be used, however in a preferred embodiment the present invention features a digital filter solution. Using one of many possible methods, a digital filter is designed to emulate the feedback impulse response. The output from the digital filter is then subtracted from the system input, whereby feedback cancellation or at least reduction is obtained.

The device may be any communication device comprising an induction pickup coil and an output transducer, preferably a speaker, however the problem described in the introductory part of the description have a significant relevance in connection with hearing aids, where only limited space is available and where the induction pickup coil is commonly used. The invention therefore concerns in a preferred aspect a hearing aid comprising the features as described in connection with the device according to the invention and as described in claim 8. In further preferred embodiments the hearing aid may comprise one or more of the features described in the foregoing as advantageous options for the device.

In a preferred embodiment of the device means are provided for detection of an oscillating feedback signal.

In addition to the feedback originating from the electromagnetic field additional feedback may occur due to the leakage between the earmould and earcanal of the hearing aid user. In order to provide remedy for this an additional equivalent adaptive correction signal may be included. Two correction signals (electromagnetic and acoustic) will be subtracted from the digital input signal (16) and thus the combined system will be stable.

DESCRIPTION OF THE PREFERRED EMBODIMENT

Figure 1:
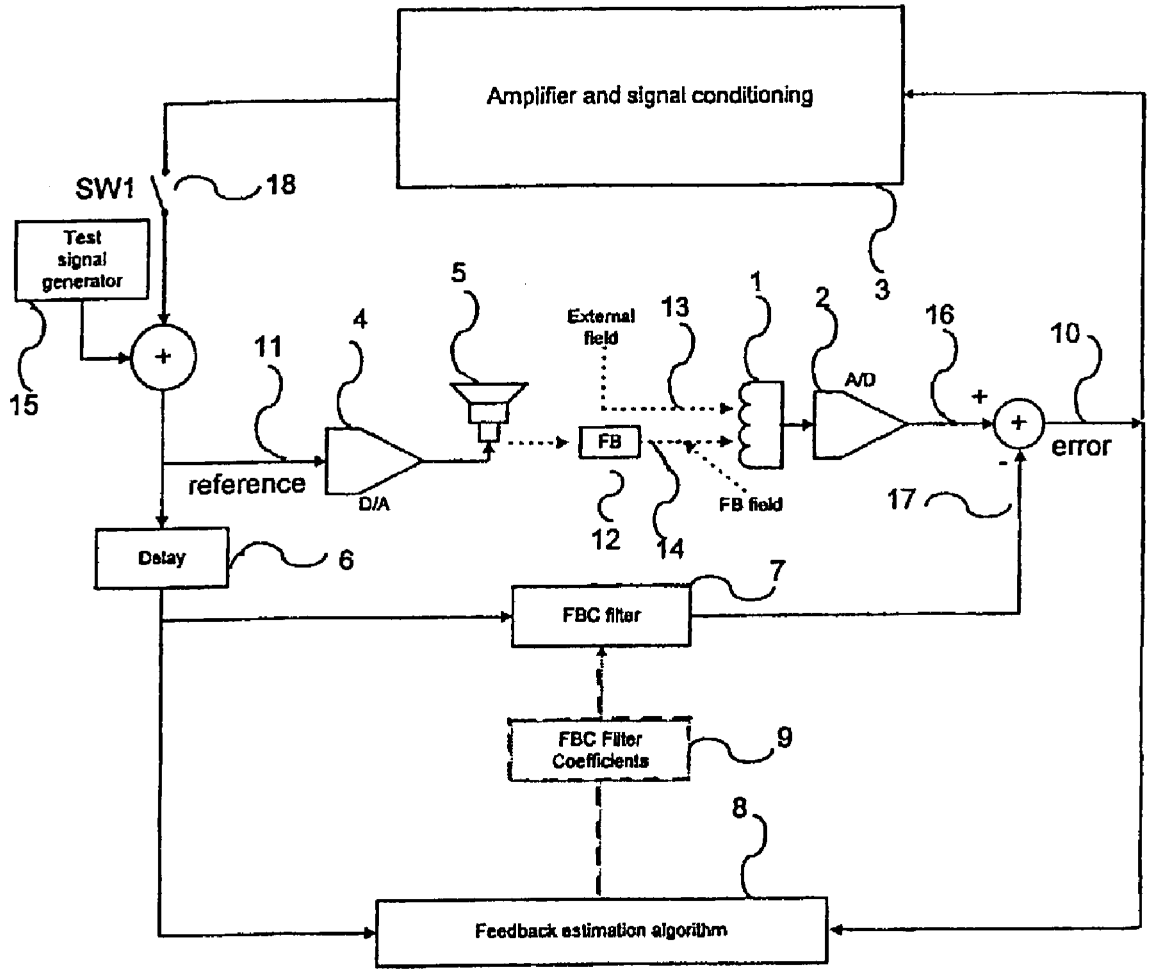
FIG. 1 is a schematic diagram showing a preferred embodiment of the invention.

A block diagram of the invention is shown on FIG. 1. All the components described below, except blocks (1), (5) and (12), operate in the discrete time domain.

The components are as follows: (1) is a pickup coil, which converts the electromagnetic field at the coil to an electric signal. The electromagnetic field is a combination of the externally generated field (13) and the field produced by the system itself ("feedback field") (14). (2) is an amplifier and an analog-to-digital converter (A/D); (3) is the system amplifier and any desirable signal conditioning; (4) is a digital-to-analog converter and a power amplifier; (5) is the system output device, symbolized here with a loudspeaker;

the output device (5) and the associated circuitry generate both a desired signal (not shown) and an electromagnetic field; the electromagnetic feedback path (12) which may be partly inside the system and partly outside, transfers an electromagnetic feedback field (14) back to the input coil; (6) is a delay unit whose delay approximately matches the delay through the components (4), (5), (12), (1) and (2). (7) is a digital filter which is intended to simulate the combined impulse response of components (4), (5), (12), (1), and (2). The filter may be of any suitable type, including FIR (Finite Impulse Response), IIR (Infinite Impulse Response) and lattice filters. (8) is an algorithm which will set or adjust the coefficients (9) of the filter (7) according to a selected feedback estimation algorithm. (15) is a signal generator which generates a "reference" signal designed for use with the algorithm (8). (10) is the "error" signal which is the difference between the digital input signal (16) and the estimated feedback signal (17). When the external input field is absent, the error signal (10) represents the error between the true feedback signal and the feedback signal estimated by the FBC filter (7). (18) is a switch which can turn off the normal system output during estimation of the feedback path.

The algorithm (8) may be one of many possible algorithms. These include, but are not limited to, LMS adaptive algorithms, cross-spectrum techniques, tone-sweep based methods, and MLS-type algorithms. In any case, the algorithm (8) should produce a set of coefficients (9) for the filter (7), such that the filter's impulse response closely resembles the impulse response of components (4), (5), (12), (1), and (2).

For some applications, the feedback cancellation system may be implemented in two fundamentally different ways: The coefficients (9) for the filter (7) may be estimated before the system is released for normal operation, or they may be estimated while the system is in normal use. The two cases may impose different restrictions on the estimation techniques, which can be used.

By means of an example, the preferred estimation techniques will be described in the following. However, the techniques described below are not exclusive. Dependent on the specific application, or even the specific parameters of an application, different solutions may be chosen.

Feedback cancellation in a hearing aid is chosen as an example. For this application, it may be assumed that the electromagnetic feedback path does not change after the hearing aid is released to the user.

Feedback Estimation Prior to System Release

The hearing aid production plant may include the feedback estimation process as part of the normal calibration and verification process, and the coefficients (9) may be stored permanently in the hearing aid. In this case, there are only few restrictions on the measurement techniques which can be used, since the system output can be disregarded.

For simplicity, the filter (7) may be selected as an FIR filter, and the algorithm (8) may be an LMS-type adaptive filter. The test signal source (15) should produce a broadband signal, while the switch (18) is open and the external field (13) is absent. A fast estimation technique can be realized in this fashion, since the LMS algorithm works under favorable conditions. In a second approach, the FIR filter coefficients may be determined by an MLS (Maximum Length Sequence) technique; in this case the test signal generator (15) should produce an MLS sequence. Thirdly, a cross-spectrum technique may be used to estimate the feedback transfer function, again using a broad-band signal generator (15). In addition to these, other techniques may be used with similar results.

Feedback Estimation While System is Operating Normally

When the system is operating normally, the system output can not be disregarded, since (for this example) the hearing aid user will be listening to the output. The same estimation techniques as described for the "prior-to release" solutions may be used here, except that the level of the test generator (15) generally must be significantly lower. The low level of the test signal generally results in a slower estimation of the feedback response.

As an alternative, the test signal generator (15) may be eliminated and the switch (18) may be closed. In this way, the normal output signal (resulting from amplification of the external input field (13)) is used as the test signal. This has the advantage that the user listens only to the desired signal (the normal output). On the other hand, this estimation technique must be carefully developed and possibly extended with auxiliary components, since the "no-noise" approach is generally prone to estimation errors when the external input signal has a non-white power spectrum.

The invention claimed is:

1. A method for reducing feedback problems caused by electromagnetic interference in a communication device, the method comprising: producing by means of a filter an equivalent of an electromagnetic feedback path in a system with a pickup coil, and subtraction of the equivalent of the feedback signal from the input signal in order to obtain feedback reduction.

2. A method according to claim 1, wherein the filter receives filter coefficients determined prior to the use of the device.

3. A method according to claim 2, wherein the filter coefficients are determined by means of a LMS algorithm, a MLS algorithm, a cross spectrum method or by a tone sweep method.

4. A method according to claim 1, which occurs during normal use of the instrument or each time the device is turned on.

5. A device comprising an induction coil and an output transducer, a voltage supply or an amplifier or a combination thereof, the device further comprising filter means for generating an equivalent of an electromagnetic feedback signal occurring between the transducer and the induction coil, and means for subtracting the equivalent from an input signal in order to obtain feedback reduction.

6. A device according to claim 5, including means for detection of an oscillating feedback signal.

7. A device according to claim 5, wherein the filter is chosen among the following: IIR, FIR or Lattice filter.

8. A hearing aid comprising an output transducer, a voltage supply or an amplifier or a combination thereof and a induction pickup coil, and filter means for generating an equivalent of an electromagnetic feedback signal occurring between the transducer and the induction coil and means for subtracting the equivalent from an input signal in order to obtain feedback reduction.

9. A hearing aid according to claim 8 in which the equivalent of the electromagnetic feedback signal is based on fixed filter coefficients and further includes an additional adaptive equivalent of an acoustical feedback signal.

* * * * *